(12) United States Patent  
McCully

(10) Patent No.: US 7,493,872 B1
(45) Date of Patent: Feb. 24, 2009

(54) LIVESTOCK EXERCISER/FEEDER

(76) Inventor: Clyde McCully, 324 Eula Dr., Paradis, LA (US) 70080

( * ) Notice: Subject to any disclaimer, the term of this patent is extended or adjusted under 35 U.S.C. 154(b) by 287 days.

(21) Appl. No.: 11/428,960

(22) Filed: Jul. 6, 2006

Related U.S. Application Data

(60) Provisional application No. 60/710,105, filed on Aug. 22, 2005.

(51) Int. Cl.
*A01K 15/02* (2006.01)
*A01K 5/00* (2006.01)

(52) U.S. Cl. .................... 119/703; 119/51.01

(58) Field of Classification Search .......... 119/702, 119/703, 743, 54, 62, 61.3, 61.31, 70, 51.01, 119/731, 732, 734, 735
See application file for complete search history.

(56) References Cited

U.S. PATENT DOCUMENTS

| 1,550,438 | A |  | 8/1925 | Hohmann |  |
|---|---|---|---|---|---|
| 1,620,686 | A |  | 3/1927 | Pauley |  |
| 1,712,613 | A |  | 5/1929 | Harms |  |
| 2,068,210 | A |  | 1/1937 | Walker |  |
| 2,358,000 | A |  | 9/1944 | Cornell |  |
| 2,416,825 | A |  | 3/1947 | Dowling |  |
| 2,709,988 | A | * | 6/1955 | Hatcher | 119/62 |
| 2,814,271 | A | * | 11/1957 | Black | 119/55 |
| 3,530,830 | A |  | 9/1970 | Smith |  |
| 3,620,192 | A | * | 11/1971 | Taylor et al. | 119/449 |
| 3,885,524 | A |  | 5/1975 | Gregory |  |
| 4,009,687 | A | * | 3/1977 | Korthals | 119/51.01 |
| 5,003,926 | A | * | 4/1991 | Bratrud | 119/62 |
| 5,146,872 | A | * | 9/1992 | Waldner | 119/54 |
| 5,303,673 | A | * | 4/1994 | Weelink | 119/60 |
| 5,433,172 | A | * | 7/1995 | Weelink | 119/57.92 |
| 6,039,002 | A | * | 3/2000 | Strankman | 119/57.1 |
| 2004/0209751 | A1 | * | 10/2004 | Thonn, Jr. | 482/140 |

* cited by examiner

*Primary Examiner*—Kimberly S Smith
(74) *Attorney, Agent, or Firm*—Garvey, Smith, Nehrbass & North, L.L.C.; Brett A. North

(57) ABSTRACT

Disclosed is a method and apparatus for exercising livestock animals to increase their muscle mass and decrease fat content. In one embodiment a feeding apparatus is provided which provides a resistance over which a livestock animal must overcome to feed. In one embodiment a feeding apparatus is provided which allows for adjustable resistance.

20 Claims, 6 Drawing Sheets

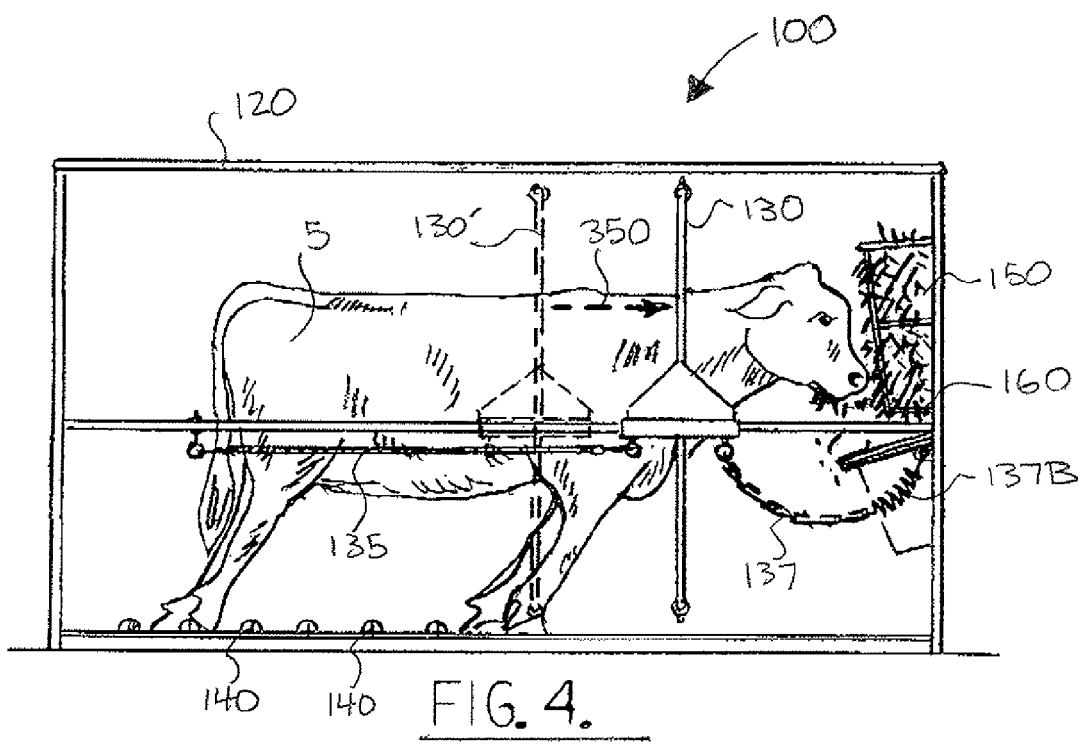
FIG. 4.
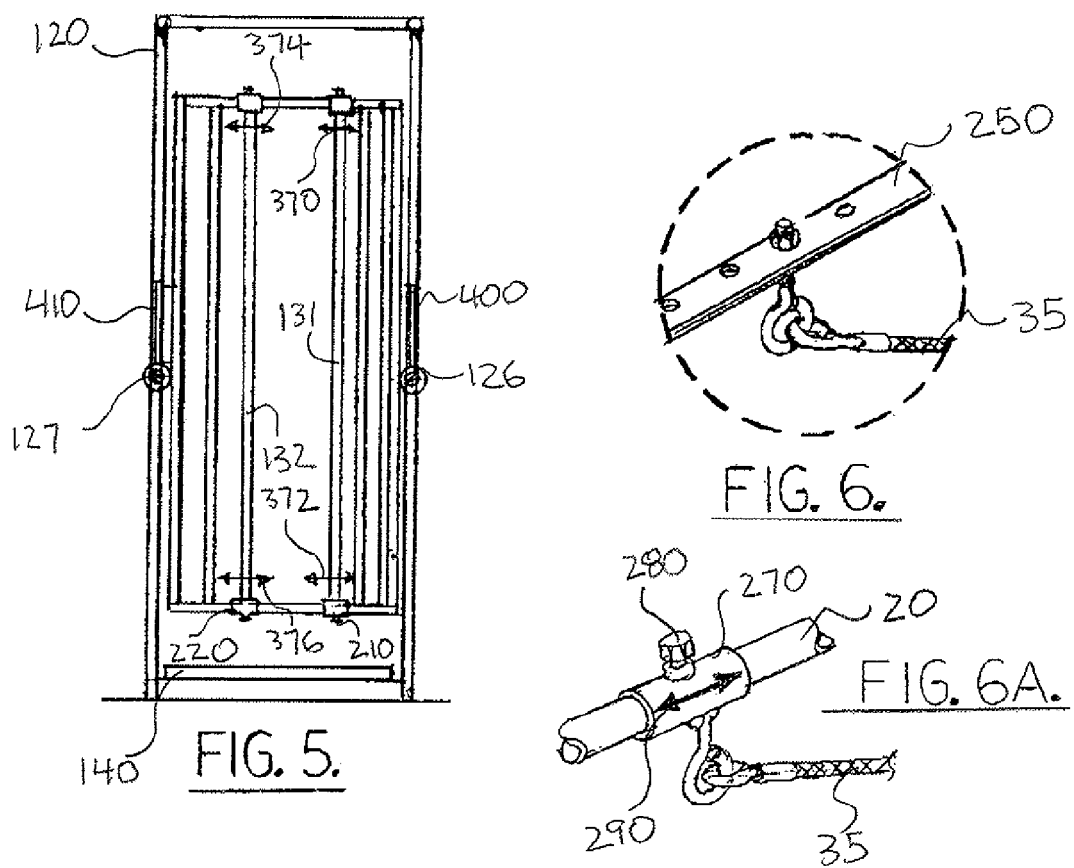
FIG. 5.
FIG. 6.
FIG. 6A.

LIVESTOCK EXERCISER/FEEDER

CROSS-REFERENCE TO RELATED APPLICATIONS

Priority of U.S. provisional patent application Ser. No. 60/710,105, filed on Aug. 22, 2005, is hereby claimed.

U.S. provisional patent application Ser. No. 60/710,105, filed on Aug. 22, 2005, is incorporated herein by reference.

STATEMENT REGARDING FEDERALLY SPONSORED RESEARCH OR DEVELOPMENT

Not applicable

REFERENCE TO A "MICROFICHE APPENDIX"

Not applicable

BACKGROUND

It can be beneficial to provide regimen of exercise for livestock animals which is expected to increase muscle mass. Livestock animals can include, but are not limited to, cattle, sheep, goats, etc.

Increasing the muscle mass of livestock animals can assist in winning livestock competitions, such as 4-H competitions. Previously, livestock animals have been allowed to exercise where they graze free. However, Applicant is aware of no exercise machines which force animals to exercise on a consistent basis. Additionally, currently there is no practical way to provide personalized exercise regimes for individual livestock animals (based on the status of an animal's muscle mass or status of development) which can be increased or decreased over time in accordance with the needs of specific livestock animals.

Increasing a livestock animal's muscle mass can increase the eye appeal of the animal. Additionally, increasing the muscle mass tends to decrease the animal's fat content (e.g., normal fat percentage) resulting in a leaner and higher value cut of meat for the consumer and is believed to considered to be an advantage in increasing the value of the animal's carcass for ultimate sale. Additionally, increasing a livestock animal's muscle mass is believed to be an advantage to an exhibitor as the animal looks better.

While certain novel features which are shown and described below are pointed out in the annexed claims, the invention is not intended to be limited to the details specified, since a person of ordinary skill in the relevant art will understand that various omissions, modifications, substitutions and changes in the forms and details of the device illustrated and in its operation may be made without departing in any way from the spirit of the present invention. No feature of the invention is critical or essential unless it is expressly stated as being "critical" or "essential."

BRIEF SUMMARY

In one embodiment what is provided is a method and apparatus for exercising livestock animals to increase their muscle mass.

In one embodiment a feeding apparatus is provided which provides a resistance over which a livestock animal must overcome to feed.

In one embodiment a feeding apparatus is provided which allows for adjustable resistance.

In one embodiment a resistance is provided to a headgate/harness apparatus.

In one embodiment the resistance provided to a headgate/harness apparatus can be varied.

In one embodiment a headgate/harness apparatus can be pivotally connected to a frame.

In one embodiment a headgate/harness apparatus can slide in relation to a frame.

In one embodiment a headgate/harness apparatus can be adjustable to accommodate livestock animals of differing sizes and configurations.

In one embodiment the headgate/harness apparatus can be automatically adjustable.

In one embodiment a plurality of headgate/harness apparatuses can be provided to exercise a plurality of livestock animals.

In one embodiment one or more problems confronted in the art are solved in a simple and straightforward manner.

The drawings constitute a part of this specification and include exemplary embodiments to the invention, which may be embodied in various forms.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIG. 4 illustrates the method of a livestock animal feeding in the exerciser of FIG. 3;

FIG. 5 is a front view of the animal exerciser of FIG. 3;

FIG. 6 is an enlarged view of an adjustment system for a biasing means for an animal exerciser;

FIG. 6A is an enlarged view of an alternative adjustment system for a biasing means for an animal exerciser;

DETAILED DESCRIPTION

Figure 1:
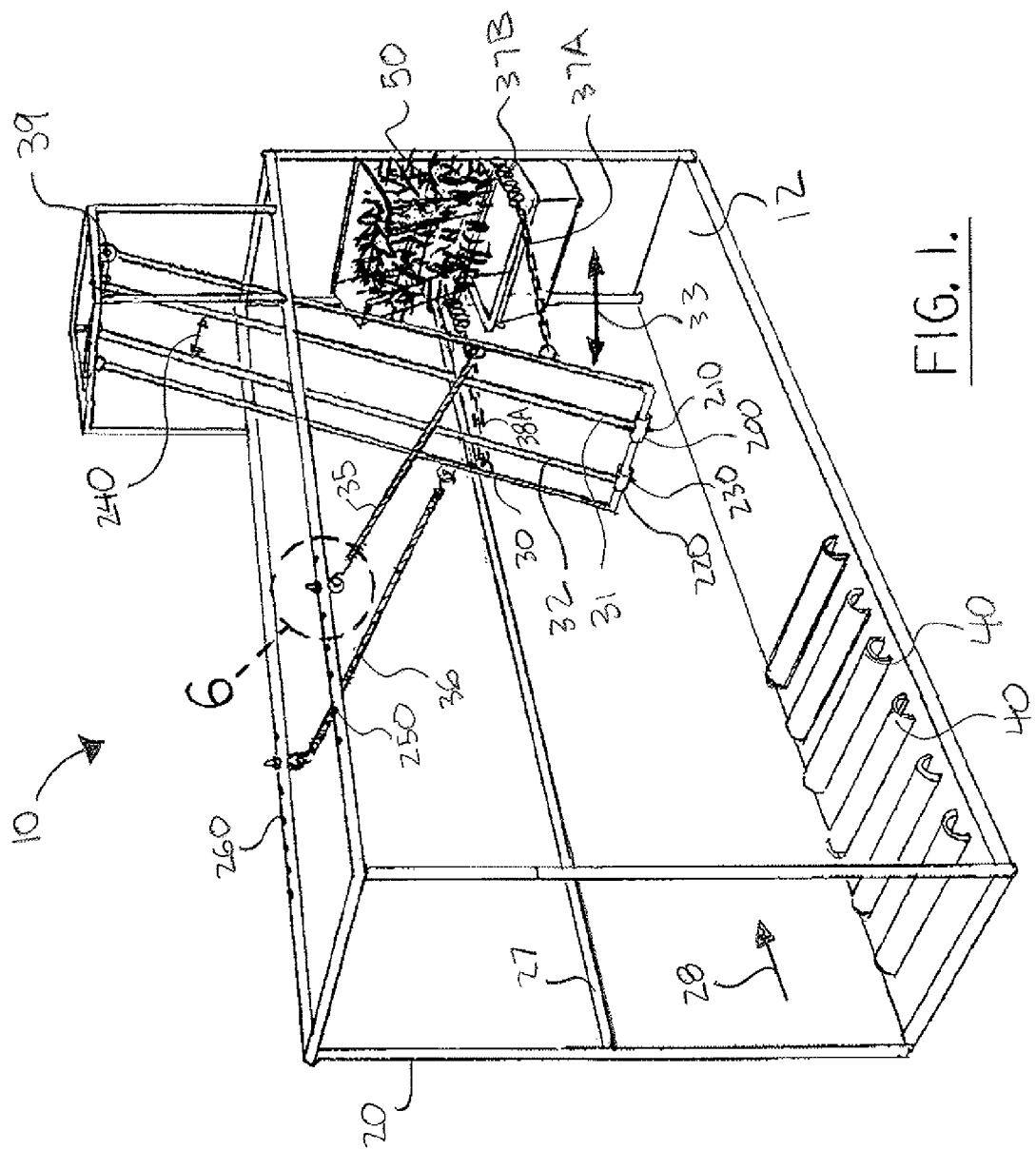
FIG. 1 is a perspective view of one embodiment of an animal exerciser.

Detailed descriptions of one or more embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in any appropriate system, structure or manner.

One embodiment includes a structure 10 including a floor 12 which is connected to an upright box-like frame 20 used as a base and foundation of the working mechanism 30 for exercising a livestock animal 5. The frame 20 can also serve as a divider between multiple adjacent reciprocating headgate/shoulder harnesses 30, 30', 30", etc.

Figure 2A:
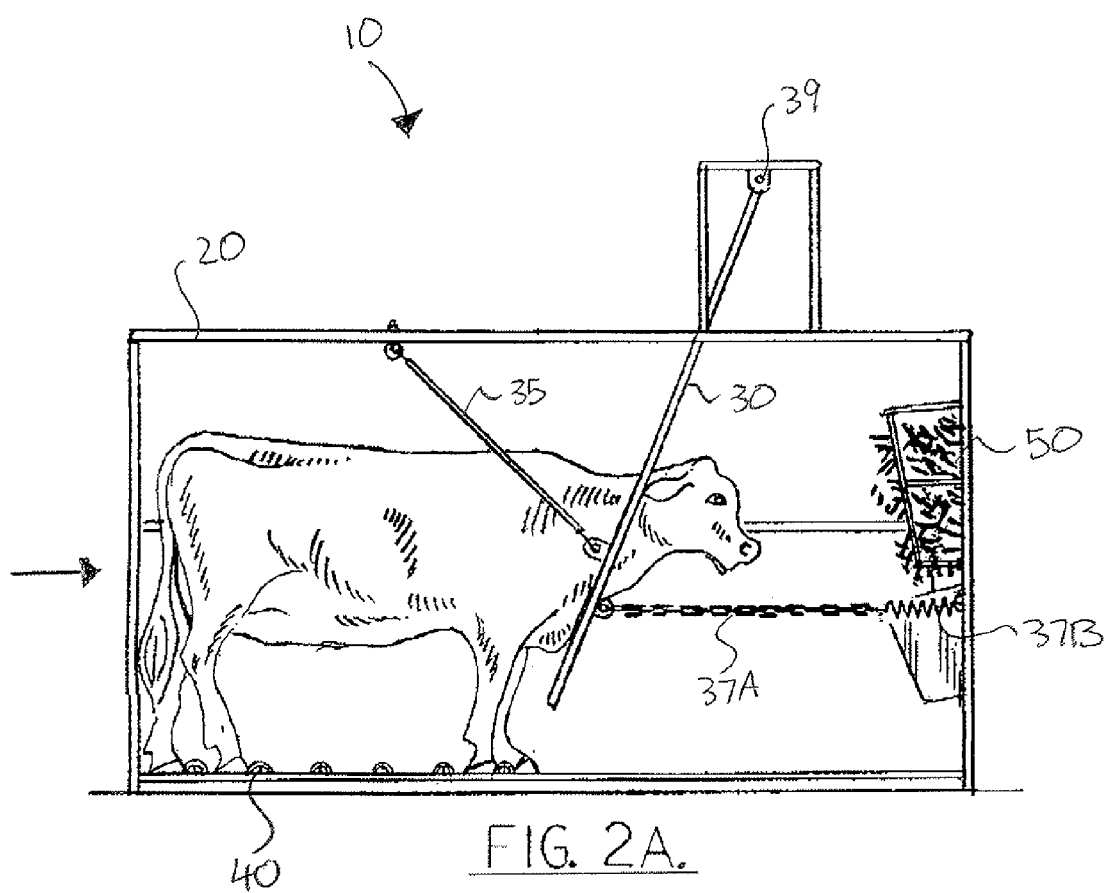
FIGS. 2A and 2B illustrate the method of a livestock animal feeding in the exerciser of FIG. 1.
Figure 2B:
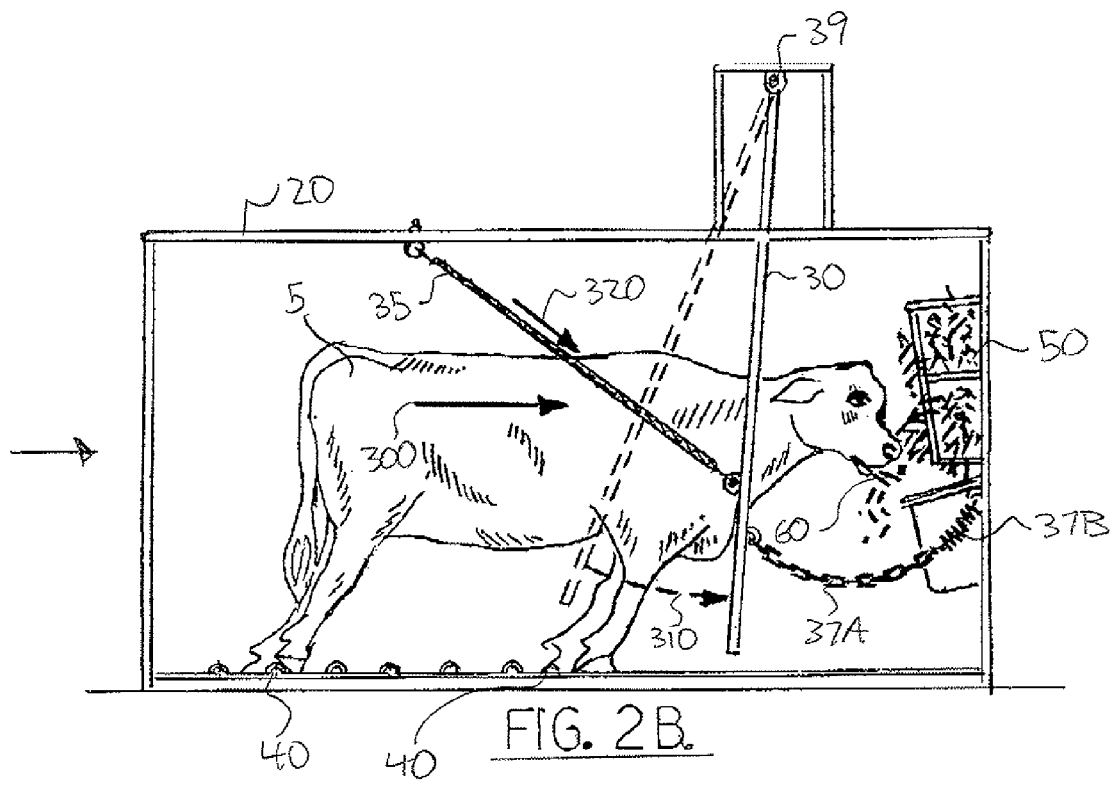
Figure 3:
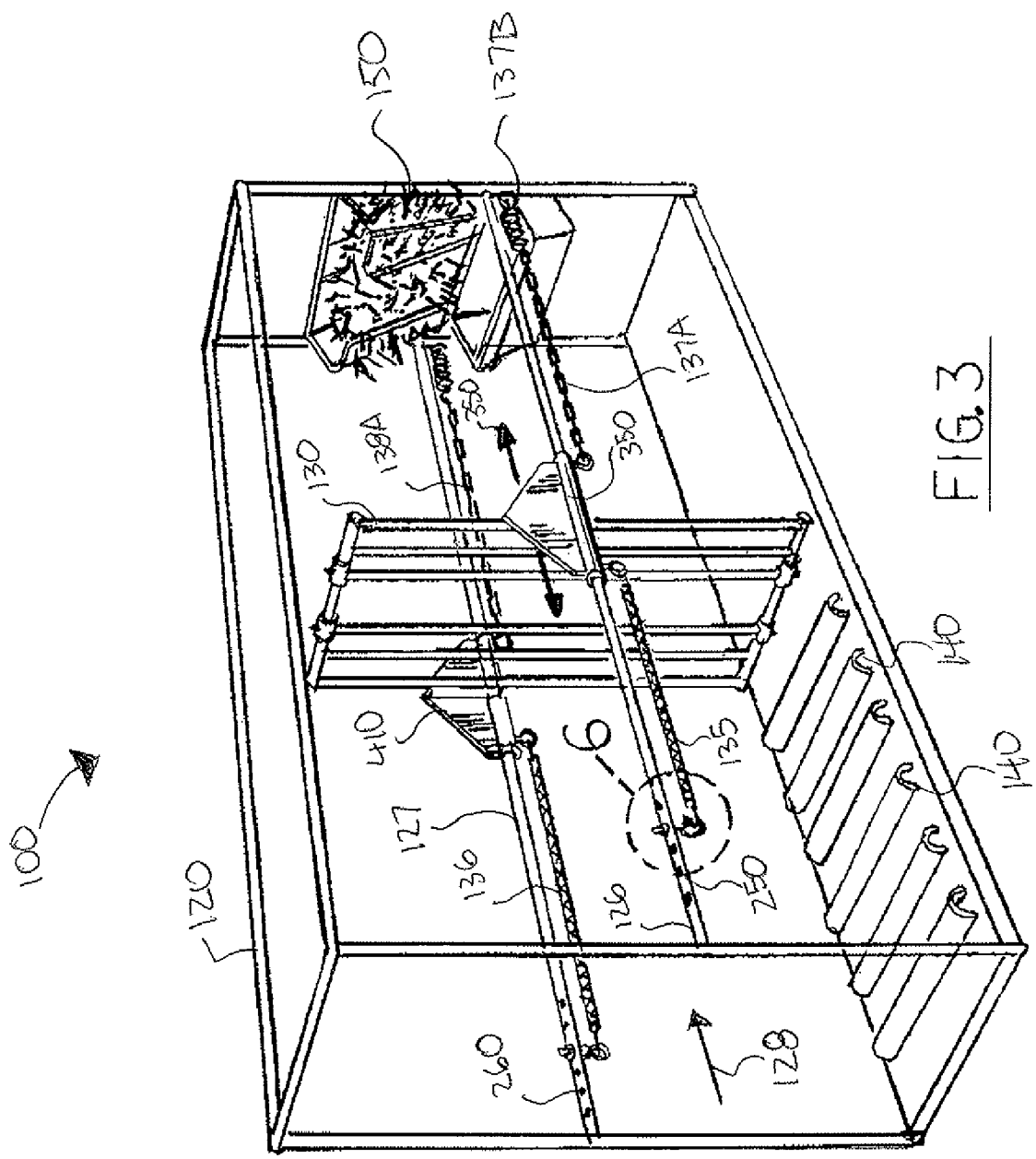
FIG. 3 is a perspective view of a second embodiment of an animal exerciser.
Figure 7:
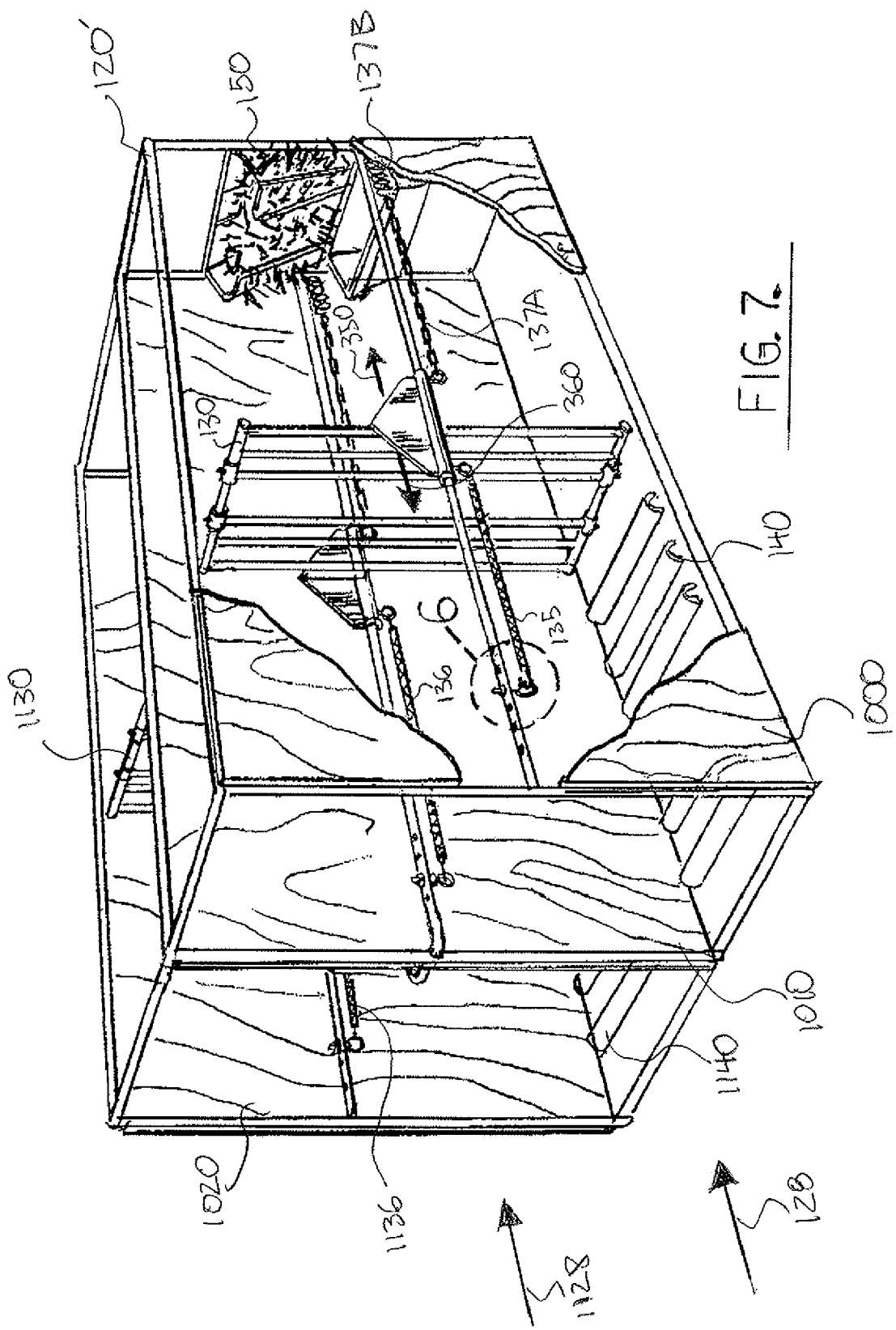
FIG. 7 is a perspective view of a multi-compartment animal exerciser which may be used in a feed stock system.

FIGS. 1, 2A, and 2B show one embodiment of an exerciser 10 which can include rectangular frame 20 with sufficient height, width, and length to comfortably encompass and allow for voluntary entry into one specified end opening 28 by a domestic meat animal 5 (e.g., cow/bovine, pig/swine, goat, sheep). Exerciser 10 also include a headgate/shoulder harness 30 that serves as a partial barrier between the animal 5 and its feed (in feeder or bucket 50).

Headgate/shoulder harness 30 serves as at least a partial barrier between the animal 5 and its feed (in feeder or bucket 50). Headgate/shoulder harness 30 can have a prescribed amount of load on it (e.g., by resistance means 35,36) so that the animal 5 must overcome to access its feed. Feed container or trough 50 can be placed at the end of stroke or point of most resistance of headgate/shoulder harness 30. FIG. 2A illustrates the point at which the animal 5 has just contacted the headgate/shoulder harness 30. FIG. 2B illustrates the point at which the animal 5 has pushed headgate/shoulder harness 30 in the direction of arrow 300 (headgate/shoulder harness 30 swinging in the direction of arrow 310) to where animal 5 can feed from feeder or trough 50 as indicated by food 60. From FIG. 2A to FIG. 2B resistance means 35,36 are stretched in the direction of arrow 320 which provides resistance which animal 5 must overcome. Overcoming this resistance is a form of exercise which is expected to increase the muscle mass of animal 5.

Headgate/shoulder harness 30 can pivot from an overhead horizontal axis 39 which can also be perpendicular to the plane of the sides of the supporting structure 20. The pivot action (arrow 33 in FIG. 1) is toward or away from the feed trough 50. A rebound limiter (e.g., chains 37A,38A) can be provided for adjusting the resting position of headgate/shoulder harness 30. Impact absorption means 37B,38B (e.g., springs, flexible cords, shock absorbers, bungee cords, etc.) can be used to prevent hammering of headgate/shoulder harness 30 when rebounding from forward movement. Headgate/shoulder harness 30 can swing from and underneath overhead horizontal axis 39 which can be perpendicular to the plane of the sides of the supporting structure 20 all of which directs headgate/shoulder harness 30 to travel toward or away from feed trough 50.

Headgate/shoulder harness 30 can include a prescribed amount of load on it (by resistance means 35,36) requiring the animal 5 to overcome to access its feed (in bucket 50). Headgate/shoulder harness 30 may be loaded to provide a resistance to the animal by a variety of methods including but not limited to: extension springs, compression springs, torsion springs, inflatable bladders, deadweights, cantilever systems, etc. The amount of resistance on headgate/shoulder harness can be varied by numerous means. Two such means include (a) biasing means of differing resistance (e.g., stronger or weaker springs) and (b) multiple adjustment points for the biasing means. FIGS. 6 and 6A show two types of multiple adjustment points.

Headgate/shoulder harness 30 can have adjustable vertical members 31,32 for adjusting the width of opening (between 31,32) to allow passage of the animal's head and properly fitted to the animal's shoulders for comfortable pushing. Adjustable vertical members 31,32 may be set to allow passage of the animal's head and properly fitted for the animal's shoulders for comfortable pushing against the loaded headgate/shoulder harness 30.

Secured hind hoof grips 40 to prevent slippage while animal is pushing with rear legs.

FIGS. 4 through 7 show a second embodiment usable for feed lots. Exerciser/feeder 100 is shown with two feeding areas 1010,1020 (although more feeding areas can be provided). Each feeding area can be similarly constructed with a feeding trough and a headgate/shoulder harness 130. To access feeder 150 the animal must push headgate/shoulder harness 130 is biased against movement (such as by biasing means 135,136). In this embodiment a sliding shoulder/headgate 130 is shown (although a pivoting one can also be used). Dividing walls 180 can be used to prevent different animals from accessing a trough other than the one entered.

Rectangular enclosure 125 with sufficient height, width, and length to comfortably encompass and allow for voluntary entry into one specified end opening by a certain domestic meat animal (cow/bovine, pig/swine, goat, sheep).

Headgate/shoulder harness 130 resting on horizontal slide rails 126,127 which facilitate movement of headgate/shoulder harness 130 toward or away from feed trough 150. Headgate/shoulder harness 130 has adjustable vertical members 131,132 that may be set to allow passage of the animal's head and properly fitted forward of the shoulders for pushing against loaded headgate/shoulder harness 130. Headgate/shoulder harness 130 serves as a resisting barrier between the animal and its feed (in feed bucket 150). Headgate/shoulder harness 130 can have a prescribed amount of load on it that the animal must overcome to access its feed.

Hind hoof grips 140 can prevent slippage while animal is pushing with rear legs.

Feed container or trough 150 normally placed sufficient distance from headgate/shoulder harness 130 to require animal to exert physical force to access feed (in feed bucket 150).

Alternatives can have rails 126,127 (and biasing means 135,136) outside of wall 180 relative to areas 110,120. This would require a slot in wall 180 and a space between feeding areas 110,120. However, it would reduce the risk that the animal would get pinched or caught in the biasing mechanism.

In one embodiment headgate/shoulder harness 30 or 130 can have automatically adjusting vertical members 31,32 or 131,132. One way to accomplish this would be to have a biasing members operatively connected to the vertical members which tend to pull the vertical members together (although the vertical members would be stopped at some minimal distance away from each other). As livestock animal 5 placed its head though the gap between the vertical members these vertical members would move away from each other allowing the head to pass through the gap in the vertical members. The vertical members would then contact the shoulders of livestock animal and provide resistance against movement towards trough or feeder 50 or 150. When livestock animal 5 finishes feeding it will back up and pull its head out of headgate/shoulder harness. The vertical members will then be pulled by the biasing member back to the minimal distance. Biasing the vertical members allows the headgate/shoulder harness to accommodate animals of differing sizes and configurations. As long as the animals' shoulders are larger than the minimum space between the vertical members the vertical members should be able to slide outward to allow the head to pass through.

It is anticipated that livestock animals will be required to go through a period of time to become acclimated to exerciser 10,100. To facilitate acclimation to the exercisers the headgate/shoulder harness can be positioned very close to the feeder or trough. In this way the animal may at first merely have to place its mouth through the headgate/shoulder harness. As the animal becomes acclimated to feeding in the exerciser and through the headgate/shoulder harness, the headgate/shoulder harness can be moved farther away from the feeder or trough. Additionally, as the animal becomes further acclimated, the amount of resistance against the headgate/shoulder harness can be gradually increased thereby increasing the exercise regime for the livestock animal.

Figure 8:
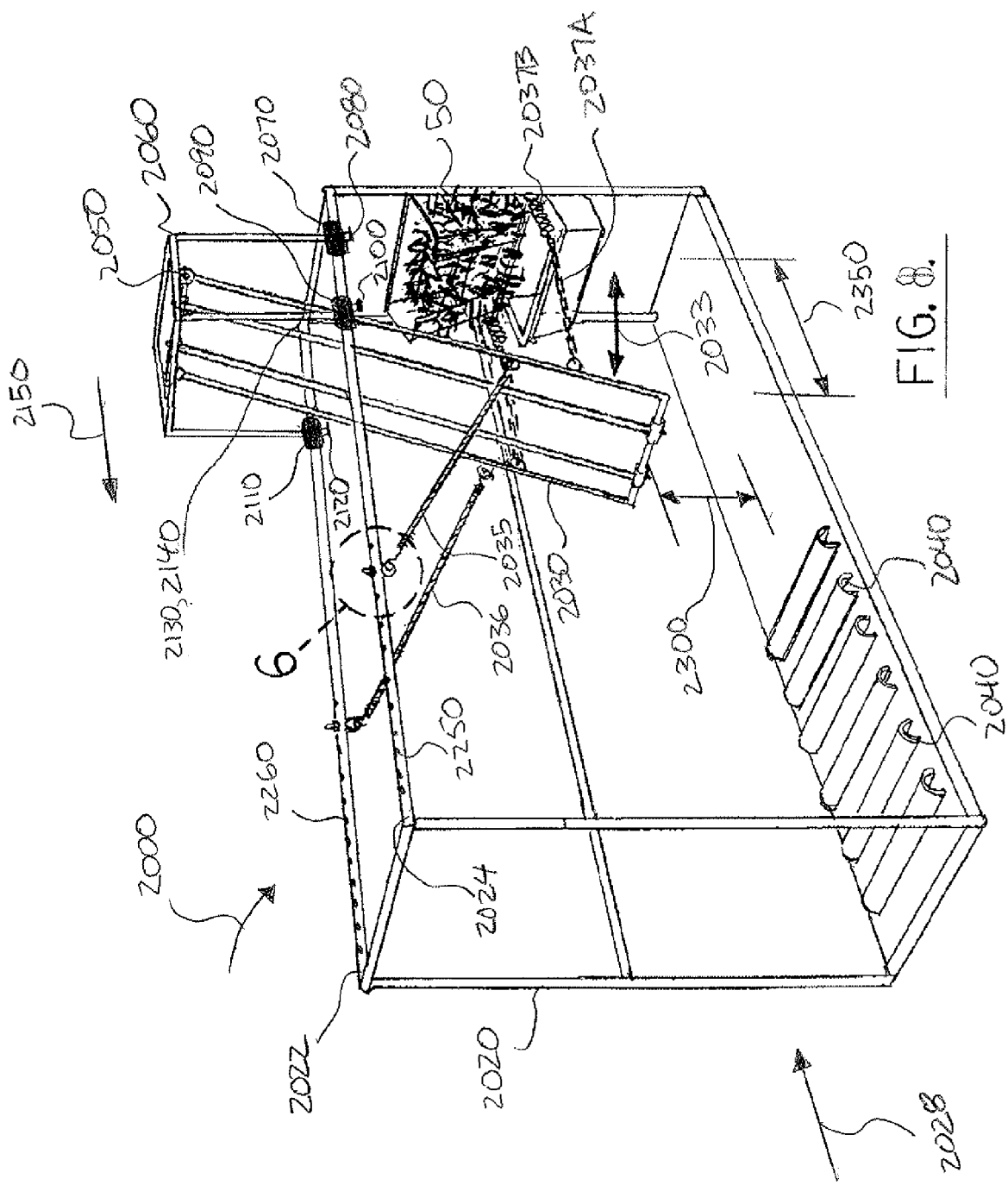
FIG. 8 is a perspective view of an alternative embodiment of an animal exerciser where the longitudinal position of headgate/shoulder harness is adjustable.

FIG. 8 is a perspective view of an alternative embodiment 2000 of an animal exerciser where the longitudinal position of headgate/shoulder harness 2030 is adjustable which can also adjust the horizontal distance 2350 for which animal 5 must move headgate/shoulder harness 2030 to reach feeder 50. Horizontal distance 2350 will be a function of the maximum and minimum vertical height 2300 of headgate/shoulder harness 2030 during the movement of headgate/shoulder harness 2030 in the direction of arrow 2033. The maximum for vertical height 2300 should not be so great that animal 5 will be uncomfortable during operation. In this embodiment, overhead horizontal axis 2050 is supported by frame 2060. Frame 2060 can be slidably located on upper frame members 2022, 2024, such as through sleeves 2070, 2090, 2110, 2130. In turn sleeves 2070, 2090, 2110, 2130 can be locked in place on upper frame members 2022, 2024 by set screws 2080, 2100, 2120, 2140. The longitudinal position of frame 2060 (along with horizontal axis 2050 and headgate/shoulder harness 2030) can be adjusted in the direction of arrow 2150 by loosening the set screws and sliding frame 2060 relative to upper frame members 2022, 2024. As frame 2050 is moved away from feeder 50, animal 5 will be required to travel a greater horizontal distance 2350 to reach feeder 50 thereby increasing the amount of exercise. Different lengths (and/or strengths) of resistance means 2035 and 2036 can be used. When being adjusted in the direction of arrow 2150 resistance means can be connected to new adjustment points in plurality of adjustment points 2250 and 2260. Alternatively the longitudinal position of feeder means can be adjusted relative to headgate/shoulder harness 2030.

In an alternative embodiment, frame 2060 can be omitted, and horizontal axis 2050 can be directly and slidingly connected to upper frame members 2022, 2024 at the top of frame 2020, such as by a plurality of sleeves with set screws. Alternatively, others means of securing horizontal axis 2050 can be used such as detachable fasteners, magnets, adhesives, pins, Velcro, rope, nails, rivets or other means for locking horizontal axis in a selected position.

The following is a list of reference numerals:

LIST FOR REFERENCE NUMERALS

| (Reference No.) | (Description) |
|---|---|
| 5 | livestock animal |
| 10 | exerciser |
| 20 | frame |
| 28 | end opening |
| 30 | headgate/shoulder harness |
| 31 | adjustable vertical member |
| 32 | adjustable vertical member |
| 33 | arrow |
| 35 | resistance means |
| 36 | resistance means |
| 37A | chain |
| 37B | absorption means for chain |
| 38A | chain |
| 38B | absorption means for chain |
| 39 | overhead horizontal axis |
| 40 | hoof grips |
| 50 | feed container or trough (which can include hay rack and lower feed bucket) |
| 60 | food |
| 110 | feeding area |
| 120 | feeding area |
| 125 | rectangular enclosure |
| 126 | horizontal slide rail |
| 127 | horizontal slide rail |
| 130 | headgate/shoulder harness |
| 131 | adjustable vertical member |

-continued
LIST FOR REFERENCE NUMERALS

| (Reference No.) | (Description) |
|---|---|
| 132 | adjustable vertical member |
| 135 | biasing means |
| 136 | biasing means |
| 137A | chain |
| 137B | absorption means for chain |
| 138A | chain |
| 138B | absorption means for chain |
| 140 | hoof grips |
| 150 | feed container or trough |
| 180 | dividing wall |
| 200 | sleeve |
| 210 | set screw |
| 220 | sleeve |
| 230 | set screw |
| 240 | arrow |
| 250 | plurality of adjustment points |
| 260 | plurality of adjustment points |
| 270 | sleeve |
| 280 | set screw |
| 290 | arrow |
| 300 | arrow |
| 310 | arrow |
| 320 | arrow |
| 350 | arrow |
| 360 | arrow |
| 370 | arrow |
| 372 | arrow |
| 374 | arrow |
| 376 | arrow |
| 400 | slide |
| 410 | slide |
| 1000 | divider |
| 1010 | divider |
| 1020 | divider |
| 1130 | headgate/shoulder harness |
| 1140 | hoof grips |
| 2000 | exerciser |
| 2020 | frame |
| 2022 | upper frame member |
| 2024 | upper frame member |
| 2028 | arrow |
| 2030 | headgate/shoulder harness |
| 2033 | arrow |
| 2035 | resistance means |
| 2036 | resistance means |
| 2037A | chain |
| 2037B | absorption means for chain |
| 2038A | chain |
| 2038B | absorption means for chain |
| 2040 | hoof grips |
| 2050 | overhead horizontal axis |
| 2060 | frame for horizontal axis |
| 2070 | sleeve |
| 2080 | set screw |
| 2090 | sleeve |
| 2100 | set screw |
| 2110 | sleeve |
| 2120 | set screw |
| 2130 | sleeve |
| 2140 | set screw |
| 2150 | arrow |
| 2250 | plurality of adjustment points |
| 2260 | plurality of adjustment points |
| 2300 | vertical height |
| 2350 | horizontal distance |

All measurements disclosed herein are at standard temperature and pressure, at sea level on Earth, unless indicated otherwise. All materials used or intended to be used in a human being are biocompatible, unless indicated otherwise.

It will be understood that each of the elements described above, or two or more together may also find a useful application in other types of methods differing from the type described above. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention set forth in the appended claims. The foregoing embodiments are presented by way of example only; the scope of the present invention is to be limited only by the following claims.

The invention claimed is:

1. An animal exerciser comprising:
   (a) a structure, the structure having an entrance;
   (b) a feeder with a feed opening, the feeder being accessible by way of the entrance;
   (c) a movable headgate, the headgate at least partially blocking access to the feeder; and
   (d) the headgate having a resistance load which must be overcome to access the feeder, and which resistance load increases as the headgate is moved towards the feed opening.

2. The exerciser of claim 1, wherein the resistance on the headgate is variable.

3. The exerciser of claim 1, wherein the resistance load is provided by at least one spring.

4. The exerciser of claim 1, wherein the resistance load is provided by at least one extensible cord.

5. The exerciser of claim 1, wherein the resistance load is provided by a plurality of extensible cords, the cords being comprised of an elastic material.

6. The exerciser of claim 1, wherein the headgate is adjustable to accommodate different sizes of livestock.

7. The exerciser of claim 1, wherein the headgate includes at least one bar slidably connected to the headgate.

8. The exerciser of claim 1, wherein the headgate includes a plurality of bars slidably connected to the headgate.

9. The exerciser of claim 1, wherein the structure includes at least one bar, and the headgate is slidingly connected to the at least one bar.

10. The exerciser of claim 1, wherein the structure includes two horizontal bars and the headgate is slidingly connected to the two horizontal bars.

11. The exerciser of claim 1, wherein the headgate is pivotally connected to the structure.

12. The exerciser of claim 1, further including a plurality of hoof grips, wherein the head gate is positioned between the feeder and the plurality of hoof grips.

13. A method of exercising a livestock animal, comprising:
   (a) providing an animal exerciser, the exerciser including:
      (i) a structure, the structure having an entrance;
      (ii) a feeder, the feeder being accessible by way of the entrance;
      (iii) a headgate, the headgate at least partially blocking access to the feeder; and
      (iv) the headgate having a resistance which must be overcome to access the feeder;
   (b) placing feed in the feeder; and
   (c) allowing the animal to enter the structure and feed at the feeder, wherein the step of training the animal in using the exerciser includes initially locating the headgate next to the feeder, allowing the animal to feed, and gradually moving the headgate away from the feeder.

14. A method of exercising a livestock animal, comprising:
   (a) providing an animal exerciser, the exerciser including:
      (i) a structure, the structure having an entrance;
      (ii) a feeder with a feed opening, the feeder being accessible by way of the entrance;
      (iii) a movable headgate, the headgate at least partially blocking access to the feeder; and
      (iv) the headgate having a resistance load which must be overcome to access the feeder, and which resistance load increases as the headgate is moved towards the feed opening;
   (b) placing feed in the feeder; and
   (c) allowing the animal to enter the structure and feed at the feeder.

15. The method of claim 14, further including the step of training the animal in using the exerciser.

16. The method of claim 14, including the further step of increasing the resistance in step "a."

17. The method of claim 14, wherein in step "a" multiple animal exercisers are provided.

18. The method of claim 14, wherein the multiple animal exercisers include walls separating the interior of one exerciser from the interior of another exerciser.

19. The method of claim 15, wherein in step "a" the headgate is longitudinally adjustable relative to the feeder.

20. The method of claim 19, wherein a plurality of set screws are used to longitudinally adjust the headgate.

* * * * *